United States Patent [19]

Wallis

[11] Patent Number: 5,311,802
[45] Date of Patent: * May 17, 1994

[54] TUBE CUT OFF MACHINE

[76] Inventor: Bernard J. Wallis, 2215 Dacosta, Dearborn, Mich. 48128

[*] Notice: The portion of the term of this patent subsequent to Sep. 14, 2010 has been disclaimed.

[21] Appl. No.: 844,437

[22] Filed: Mar. 2, 1992

Related U.S. Application Data

[63] Continuation-in-part of Ser. No. 682,725, Apr. 9, 1991, Pat. No. 5,243,889.

[51] Int. Cl.⁵ .............................................. B23D 25/04
[52] U.S. Cl. ........................................ 83/311; 83/320; 83/353
[58] Field of Search ................. 83/303, 119, 120, 150, 83/158, 286–293, 310, 311, 318–320, 326, 353, 370, 647.5, 602; 74/600, 837

[56] References Cited

U.S. PATENT DOCUMENTS

| | | | |
|---|---|---|---|
| 3,777,605 | 12/1973 | Spier | 83/602 |
| 4,462,290 | 7/1984 | Wallis | 83/311 |
| 4,544,293 | 10/1985 | Cranston et al. | 83/602 |
| 4,643,063 | 2/1987 | Gobien | 83/311 |
| 4,939,967 | 7/1990 | Wallis | 83/150 |
| 5,063,801 | 11/1991 | Wallis | 83/37 |

Primary Examiner—Eugenia Jones
Assistant Examiner—Allan M. Schrock
Attorney, Agent, or Firm—Barnes, Kisselle, Raisch, Choate, Whittemore & Hulbert

[57] ABSTRACT

A cut-off machine for cutting off predetermined lengths from a moving length of roll form material such as tubing adapted to be positioned downstream from a source comprising a plurality of cut-off assemblies which are reciprocated longitudinally of the moving length of material and operated during the movement to sever plural predetermined lengths. A servo motor crank drive assembly is provided which includes a crank having a roller which is yieldingly engaged with a cam track that has a flat tangential portion such that the roller traverses the flat portion. During this movement across the flat portion, the cut-off assemblies are reciprocated driven at a speed corresponding to the speed of movement of the tube at the time the lengths of tubing are being cut off. The apparatus can be adjusted to cut tubes of different lengths by moving the pivot point of a differential beam pivot assembly wherein one end of the beam is driven in a linear reciprocating path by a crank and the other end of the beam is connected to reciprocate the cut-off assemblies such that they are driven at a speed corresponding to the speed of the tube at the time the lengths of tubing are cut off.

5 Claims, 13 Drawing Sheets

TUBE CUT OFF MACHINE

This application is a continuation-in-part of United States application Ser. No. 682,725 filed Apr. 9, 1991, now U.S. Pat. No. 5,243,889.

This invention relates to severing of roll-formed tube stock and the like, and more particularly to an improved machine and method for severing a continuous length of tube stock into individual lengths as the stock moves at high speed in a continuous uninterrupted motion in the direction of its length.

BACKGROUND AND SUMMARY OF THE INVENTION

In manufacture of many products, such as heat exchanger tubes, for example, there is a need for large quantities of tubes cut to very precise lengths with ends accurately perpendicular to the axis of the tube stock. Machines for cutting such tubes to length have been provided heretofore. From the standpoint of economy, it is a practical necessity that such machines be capable of cutting tubes while a continuous length of tube stock is moving in the direction of its length at relatively high speed, preferably as the tubing leaves the last forming stage of a tube mill. Thus, such machines invariably employ a slide of some type on which a cut-off device is mounted and means for moving the slide at the same speed as the tube during the severing operation. Heretofore, complicated and costly devices have been employed for synchronizing the speed of the tubing and the slide on which the cut-off device is mounted. Such synchronizing devices have been not only expensive, but also incapable of functioning accurately when the tube speed is high, for example, in excess of about 175 feet per minute.

In prior art U.S. Pat. No. 4,462,290, a tube cut-off unit is arranged at the downstream end of a tube mill and is powered by a drive unit mechanically driven by the main shaft of the mill that drives the tube forming rolls. The drive unit mechanically rotates a crank which, through a link, reciprocates a slide along the path of travel of the tube. A tube cut-off blade on the slide is cam actuated by motion of the slide along its base to move in a straight line laterally of the tube to sever the tube. The slide moves at a constant speed and at the same speed as the tube when the tube is severed.

In U.S. Pat. No. 4,939,967, the cut-off machine comprises a plurality of cut-off assemblies that are reciprocated on a slide longitudinally of the moving length of tube formed by the mill, and are operated during such movement to sever plural predetermined lengths. The reciprocating and cutting movements are mechanically derived from an electric motor driven in synchronism with the speed of the tubing length. The apparatus includes mechanisms that permit the length of the severed tubes tube to be changed while the machine is operating. Each cut-off assembly includes a knife blade mounted on a chain for movement in an endless path in a plane perpendicular to the path of the tubing. A portion of the blade path is in a straight line transversely to the axis of movement of the moving length of tubing when the blade intersects the tubing path and severs the tube stock.

In U.S. Pat. No. 5,063,801, there is described an apparatus wherein a continuous length of material such as tube stock is severed into individual stock lengths by propelling the stock in a continuous uninterrupted motion in the direction of its length along a predefined path. A slide or carriage is continually reciprocated in a direction parallel to the stock path in synchronism with motion of the stock along the path such that velocity of the carriage is equal to velocity of the stock during a portion of each carriage motion cycle. A knife blade is continually rotated on the carriage about an axis parallel to the stock path and in synchronism with motion of the stock along the path such that the knife blade intersects the stock path during the portion of the carriage motion cycle in which carriage velocity equals stock velocity. As the knife blade intersects the path, the knife blade is moved radially inwardly of its axis of rotation, such that the compound result of rotary and radial motion of the knife blade with respect to its axis of rotation moves the knife blade in a straight line tangential to its axis and transverse to the path when the knife blade intersects the stock path and severe the stock.

Such cut-off machines utilize a relatively complex crank mechanism for moving the crank for reciprocating the cut off assemblies as well as an electronic circuit for controlling the servo motor insuring that the speed of movement of the cut off assemblies at cut off is synchronized with the speed of the servo motors, as described in the aforementioned U.S. Pat. No. 5,063,801.

In copending United States application Ser. No. 07/682,725 filed Apr. 9, 1991, there is disclosed a cut-off machine for cutting off predetermined lengths from a moving length of roll form material such as tubing adapted to be positioned downstream from a source such as a tube mill for receiving a moving length from the mill and severing plural predetermined lengths from the moving length. The machine comprises a plurality of cut-off assemblies which are reciprocated longitudinally of the moving length of material formed by the mill and operated during the movement to sever plural predetermined lengths. The reciprocating and cutting movements are derived from a differential beam pivot assembly wherein one end of the beam is driven in a linear reciprocating path by a crank and the other end of the beam is connected to reciprocate the cut-off assemblies such that they are driven at a speed corresponding to the speed of the tube at the time the lengths of tubing are cut off. The apparatus can be adjusted to cut tubes of different lengths by moving the pivot point of the differential beam.

Among the objectives of the present invention are to provide a tube cut-off machine wherein the cut-off assemblies are being reciprocated at a speed corresponding with the speed of movement of the tube during the time that the lengths of tubing are being cut-off; wherein the machine achieves such results mechanically; and wherein the machine functions reliably and efficiently.

In accordance with the invention, the cut-off machine includes a servo motor crank drive assembly which includes a crank having a roller which is yieldingly engaged with a cam track that has a flat tangential portion such that the roller dwells at said flat portion. During this movement, the cut-off assemblies are reciprocated driven at a speed corresponding to the speed of movement of the tube at the time the lengths of tubing are being cut-off.

DESCRIPTION

Figure 1:
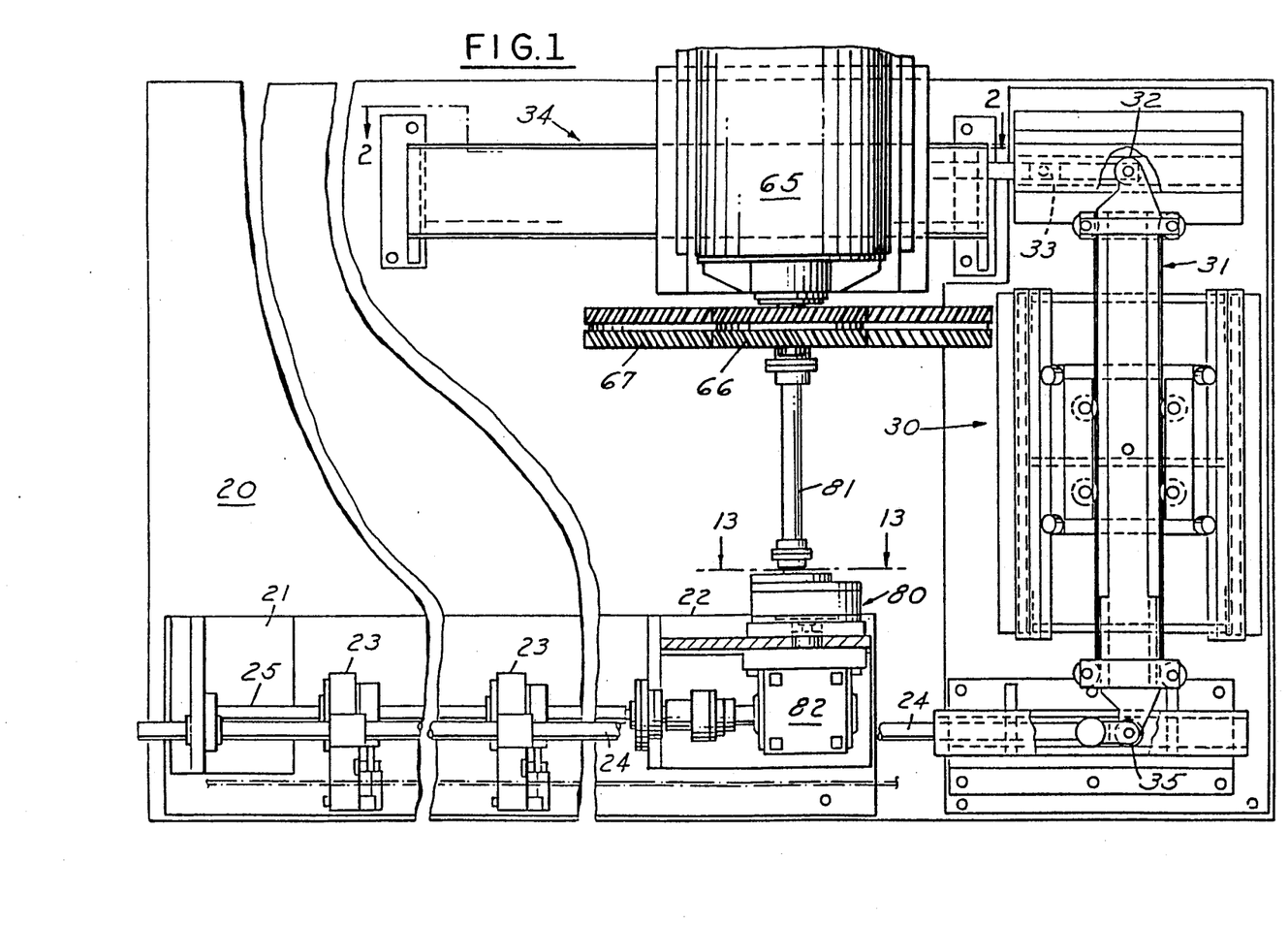
FIG. 1 is a fragmentary plan view of a cut-off machine embodying the invention.
Figure 2:
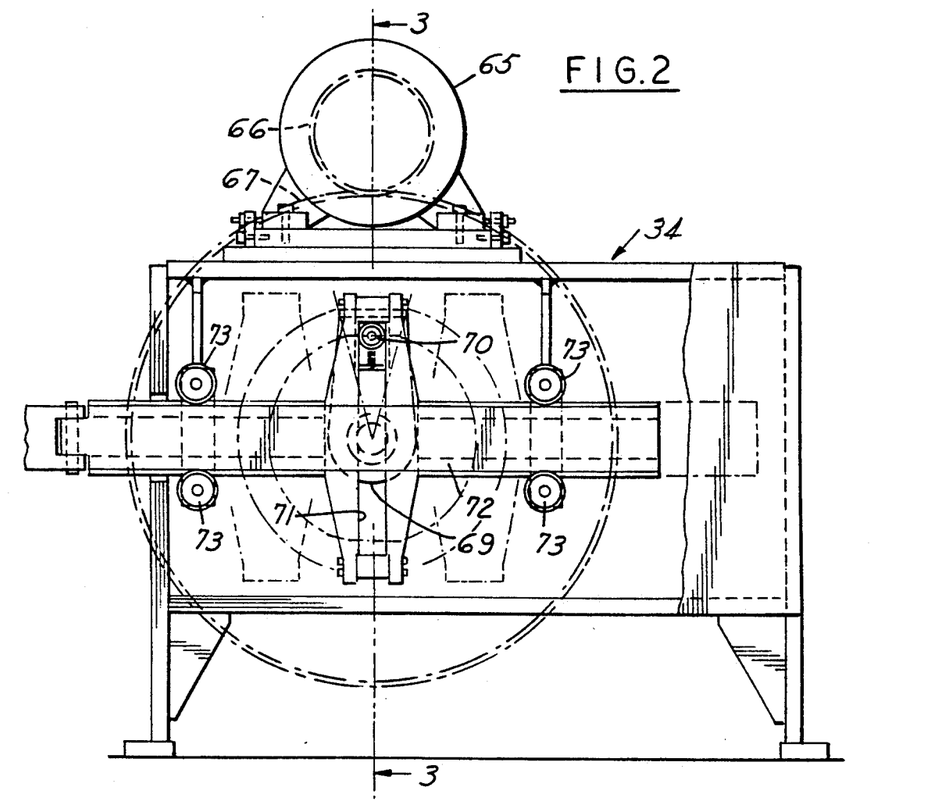
FIG. 2 is a part sectional view on an enlarged scale taken along the line 2—2 in FIG. 1.
Figure 3:
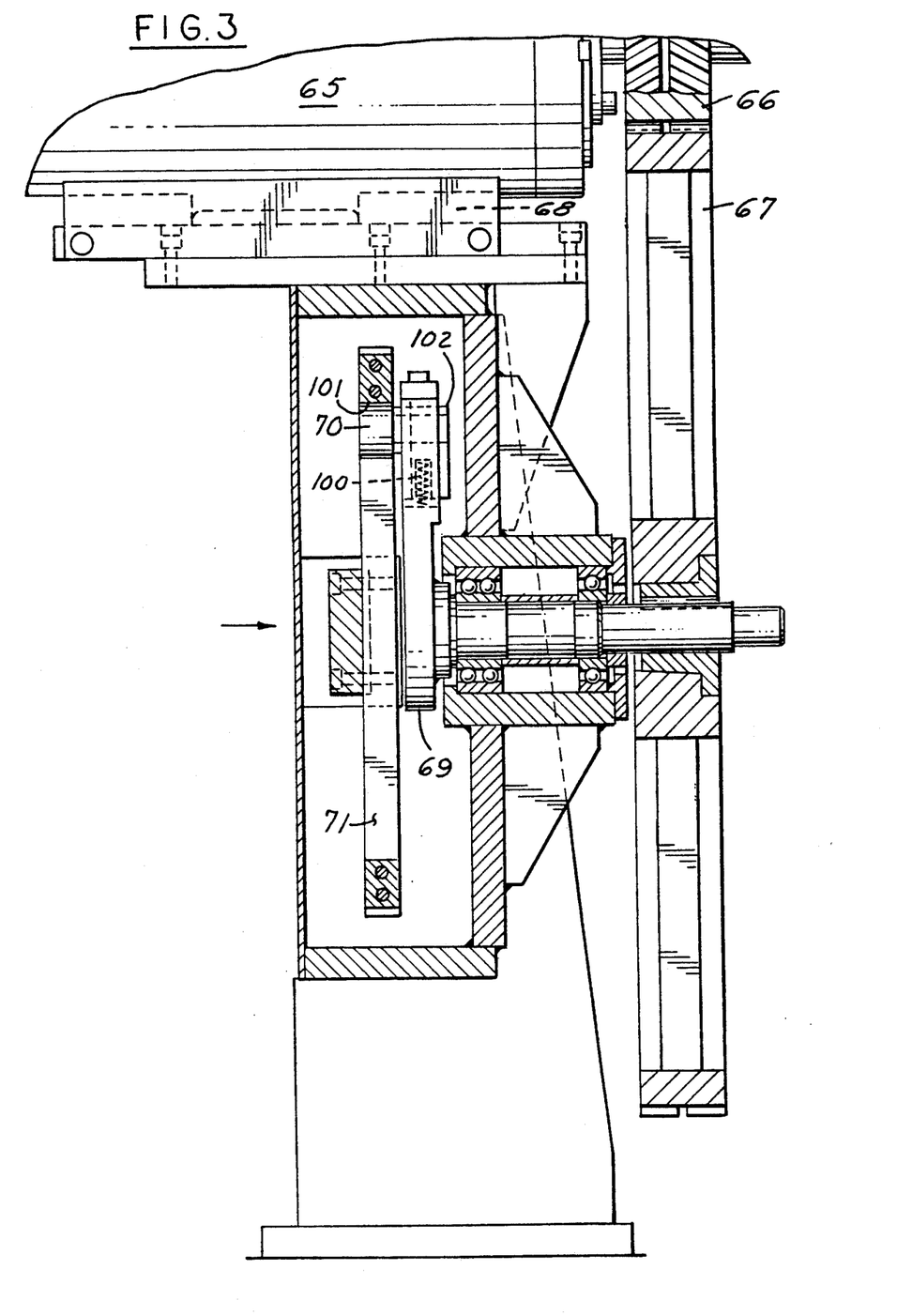
FIG. 3 is a part sectional view taken along the line 3—3 in FIG. 2.
Figure 4:
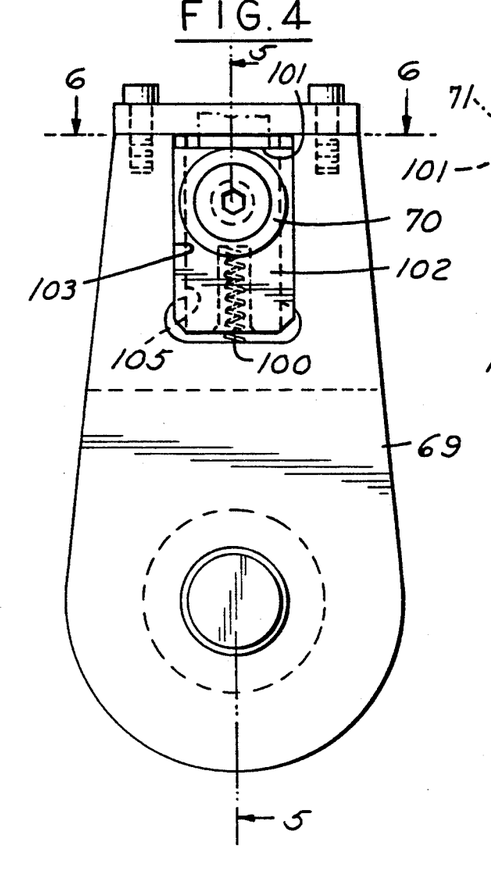
FIG. 4 is a part sectional view taken in the direction of the arrow in FIG. 3.
Figure 5:
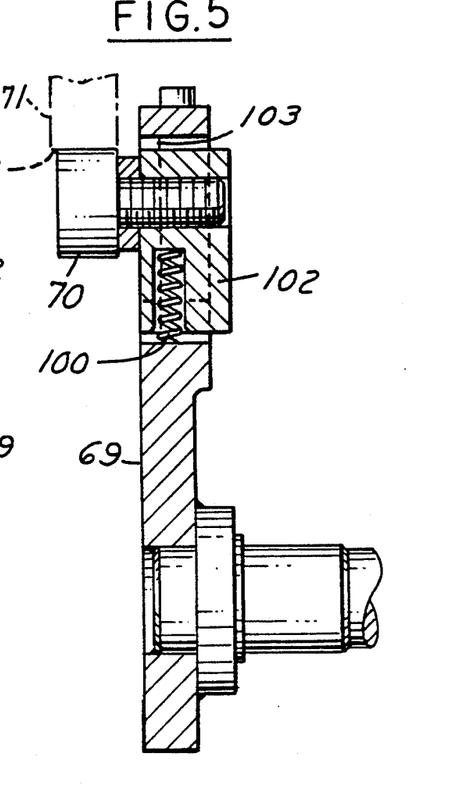
FIG. 5 is a sectional view taken along the line 4—4 in FIG. 4.
Figure 6:
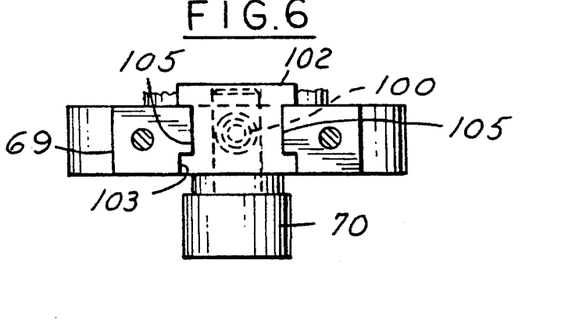
FIG. 6 is a sectional view taken along the line 5—5 in FIG. 4.

Referring to FIGS. 1 and 2, the cut-off machine embodying the invention is adapted to receive a continuous moving length of material such as roll form material like tubing from a source such as a tube mill and simultaneously cut off a plurality of lengths from the moving length as the tubing is moving away from the tube mill. The machine comprises a base 20 and uprights 21,22 on the base 20 which support a plurality of tube cut-off assemblies 23, herein shown as two, which are reciprocated longitudinally and are moved simultaneously in synchronism with the tube. Each cut-off assembly 23 include a knife blade that is rotated to cut off a length of tube from the tubing, as presently described. The drive is derived from a servo motor 65 which drives a gear and crank assembly 25 mounted on base 20 which, in turn, reciprocates the cut-off assemblies 23 and rotates the cutting knives of the cut-off assemblies 23, as presently described.

Each cut off assembly 23 is preferably of the type shown in the aforementioned U.S. Pat. No. 4,939,967 and application Ser. No. 07/462,049 incorporated herein by reference. Each tube cut-off assembly 23 includes a body fixed on dual shaft 24 which is mounted on the uprights 21,22 for longitudinal reciprocation in linear bushings. Each body is also supported for longitudinal reciprocating movement relative to a spline shaft 25 extending longitudinally between the uprights 21, 22.

Spline shaft 25 extends through bushings such that the shaft 25 can rotate and drive the cutter blade in each cutter assembly during relative longitudinal movement. One body is maintained at a predetermined distance with respect to the other body corresponding to the length of the tubing to be cut by the respective knives by a threaded shaft rotatably mounted in the body and threaded into a unit 23.

As shown in the aforementioned application Ser. No. 07/462,049, the position of one tube cut-off assembly relative to the other can be adjusted by a threaded shaft. This is achieved by an extension in the form of spline shaft connected to the end of threaded shaft by a coupling and extending through a ball spline bearing on upright 22. A hand crank drives a right angle box having a gear that meshes with a gear which, in turn, meshes with a gear on the shaft to translate one cut off assembly along shaft and thereby adjust the distance between knives cut off blades on the cutter assemblies. A servo motor may be provided to form a power drive.

Referring to FIGS. 1-7, the servo motor crank drive assembly 34 comprises a servo motor 65 that drives a sprocket 66 which, in turn, drives a sprocket 67. The sprocket 67 is fixed on the shaft that drives a crank 69. The crank 69 has a roller 70 thereon engaging a slot track 71 extending transversely on an actuator slide 72 guided by spaced rollers 73.

Figure 9:
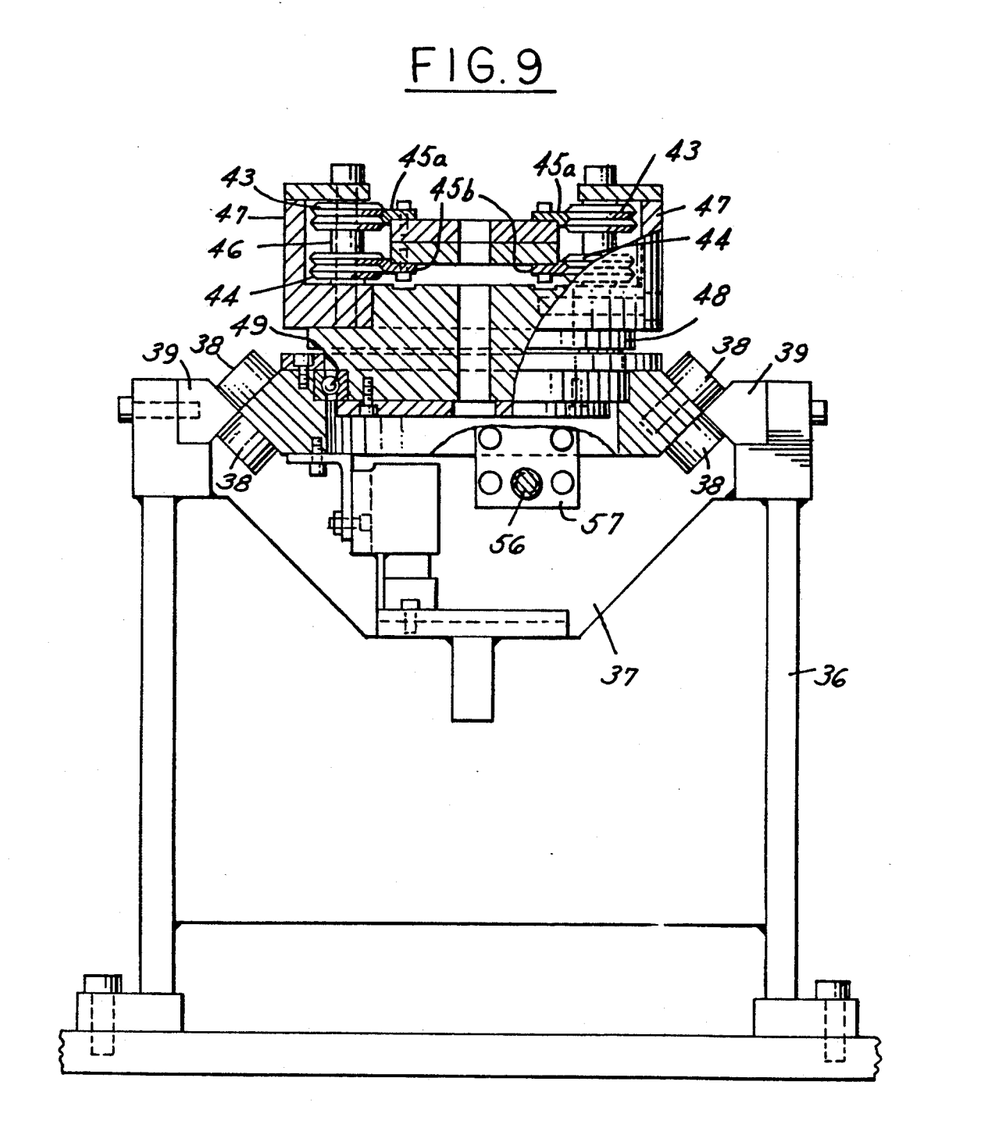
FIG. 9 is a sectional view taken along the line 9—9 in FIG. 8.
Figure 10:
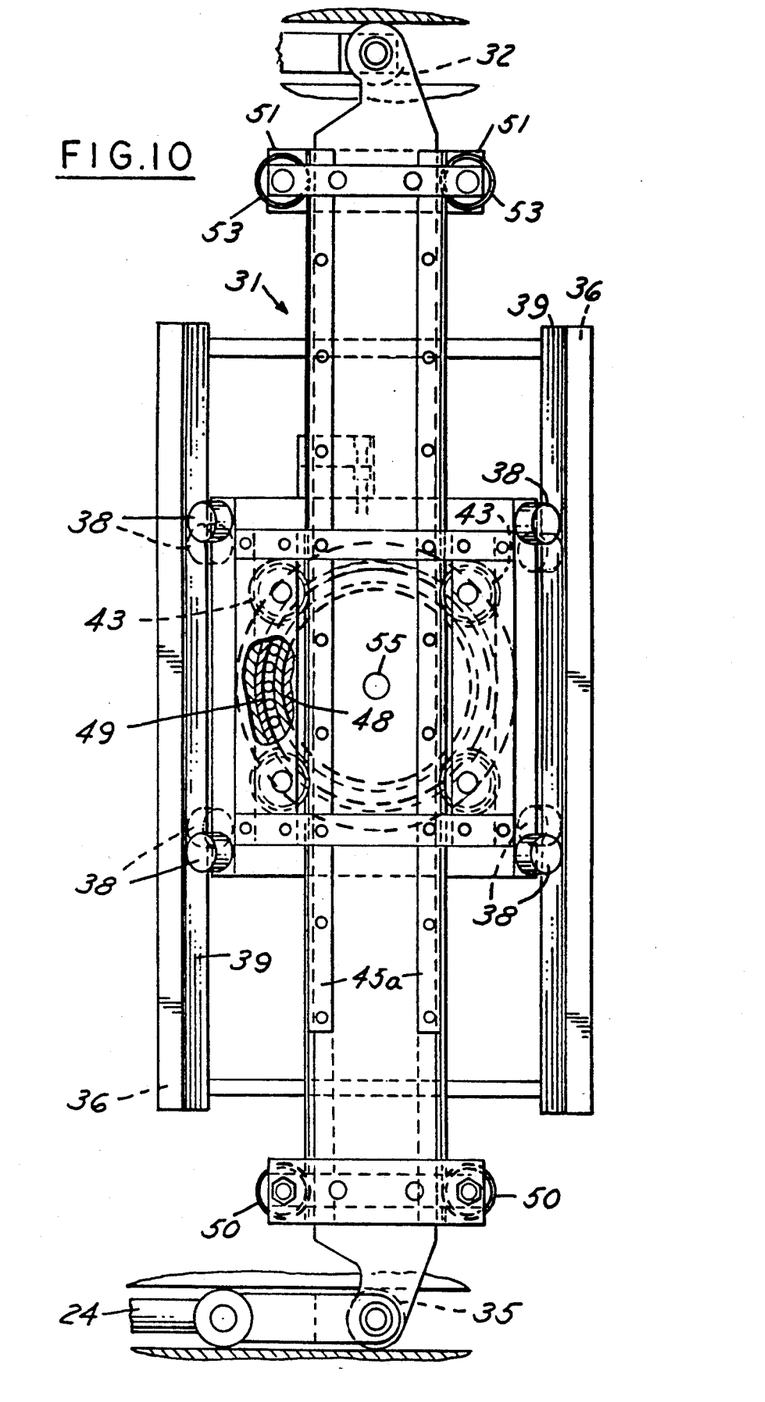
FIG. 10 is a fragmentary part sectional plan view on an enlarged scale taken along the line 10—10 in FIG. 8.

Continuous rotation of crank 69 reciprocates actuator slide 72 and, in turn, reciprocates the end 32 of the differential beam 31. This oscillates the beam 31 about its pivot providing a predetermined stroke on the other end 33 of the differential slide 31. The movement of the end 32 in a straight line is guided by spaced rollers 74 which engage a fixed track 75 on the upright 58 (FIG. 9). The movement of the end 33 is in a straight line is guided by rollers 76 on a support 77, the rollers 76 engaging a fixed track 78 on an upright 79.

The servo motor 65 also drives the rotation of the spline shaft 25 which rotates the cutters of the cut off assemblies 23. Alternatively, a separate servo motor may be used. During the drive to the differential slide 31, the beam portions 31a, 31b move longitudinally relative to one another so that the input end 32 and output ends travel parallel paths.

The servo system must provide one revolution of the crank per cut off cycle.

Figure 11:
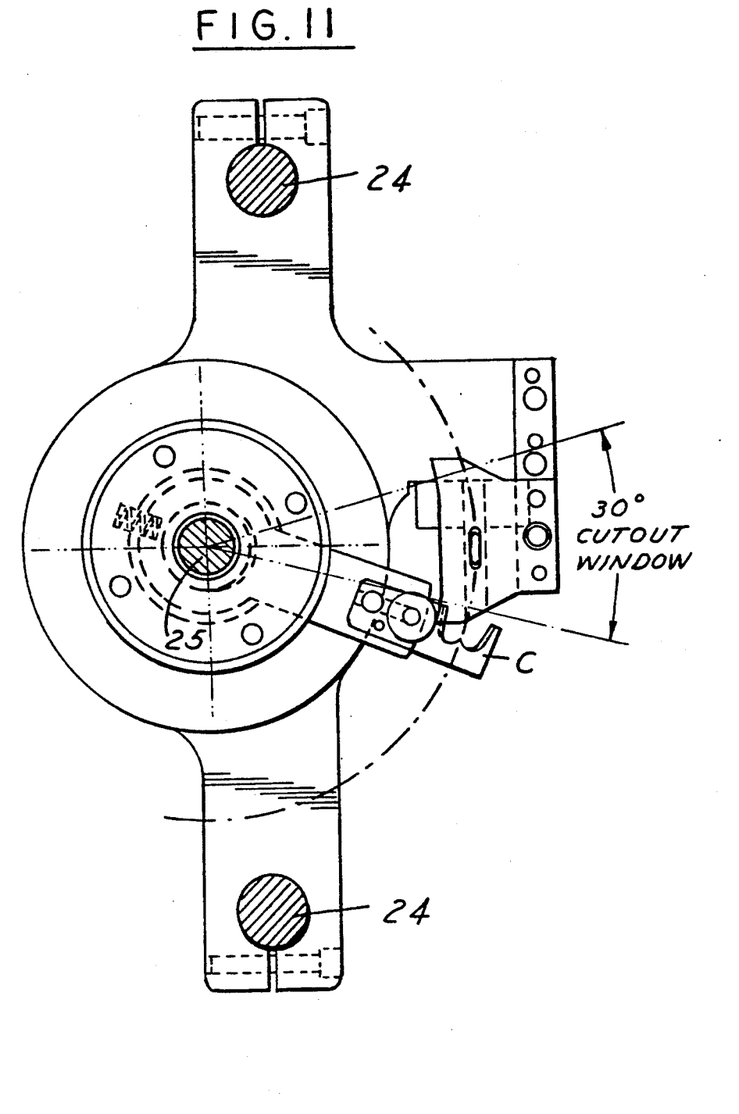
FIG. 11 is a sectional view of a typical tube cut-off assembly.

The cut off blade C must pass through the tube within during the time the crank pin passes through a predetermined window, for example, a 30° window as shown in FIG. 11. During this time, the speed of the tube and the longitudinal motion of the cut off assemblies must be synchronized via the differential pivot.

In accordance with the invention, crank 69 includes a roller 70 that is yieldingly urged radially outwardly by a spring 100 against the track 71 which has a flat tangential portion 101. Roller 70 is preferably mounted on a slide 102 that is mounted in a slideway formed by grooves 105. Ribs 103 engage the slide 102.

The drive for reciprocating the cut off assemblies 23 comprises a differential beam pivot assembly 30 which includes a differential beam 31 that is extensible along its length and has one end 32 pivoted to a reciprocating connector 33 driven by a servo motor crank drive assembly 34. The other end 33 of the beam 31 is pivoted by a connector 35 to the shaft 24 on which the cutter assemblies 23 are fixed.

Referring to FIGS. 7-10, the differential beam pivot assembly 30 comprises a base 36 on which a slide 37 is mounted for horizontal movement by angled rollers 38 on the slide 37 engaging spaced V-shaped tracks 39.

Differential beam 31 comprises an upper beam portion 31a and a lower beam portion 31b which are slidable longitudinally of one another on spaced sets of upper V-shaped rollers 43 and lower V-shaped rollers 44 which are engaged by V-shaped guides 45a, 45b on the beam portions 31a, 31b. Each set of rollers 43, 44 is rotatably mounted on a vertical shaft 46 on brackets 47 mounted on a pivot carriage 48 mounted for rotation on the slide 37. Vertical ball bearings 49 facilitate rotation of carriage 48 relative to slide 37.

Figure 7:
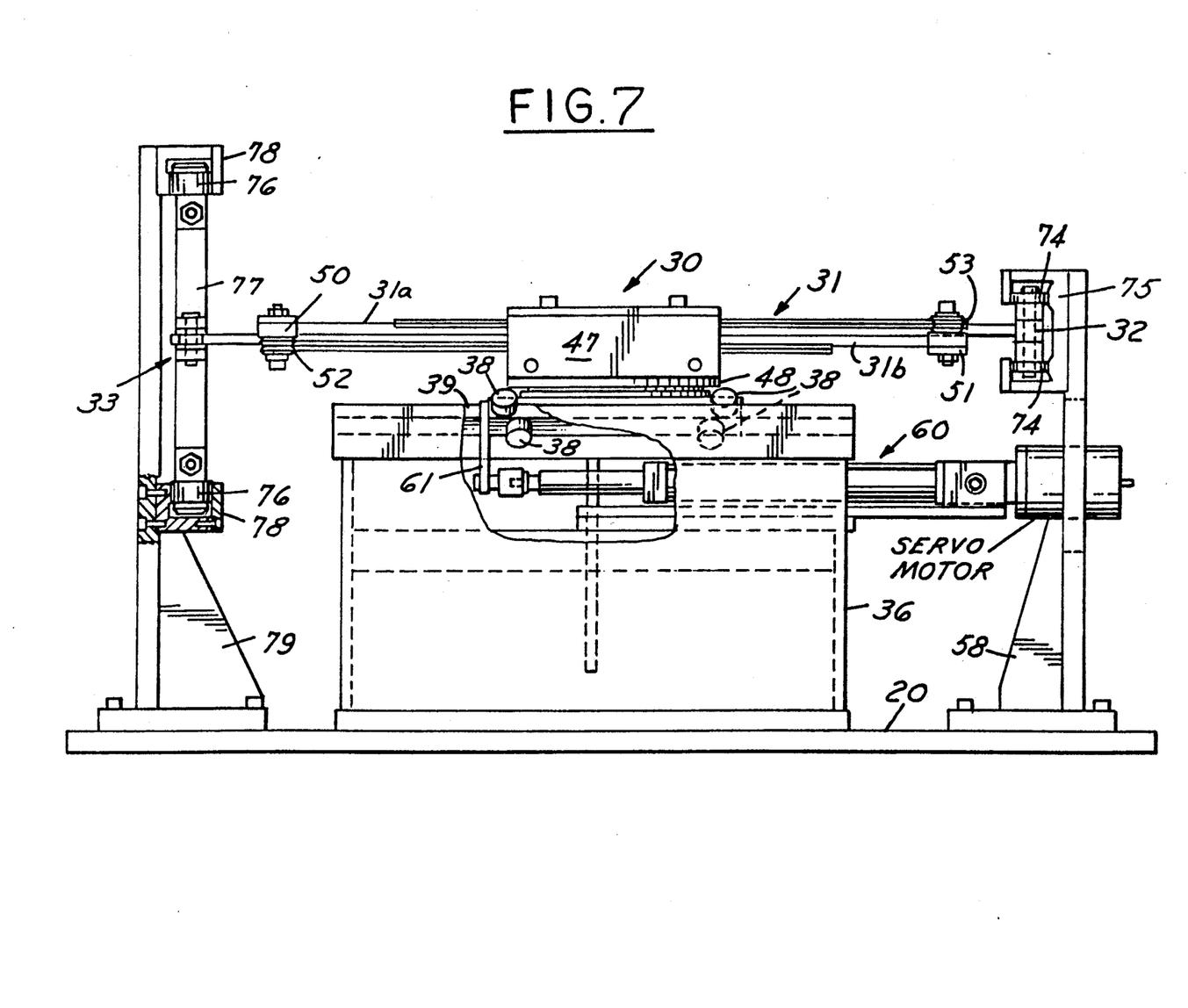
FIG. 7 is a end view taken from the right in FIG. 1.
Figure 8:
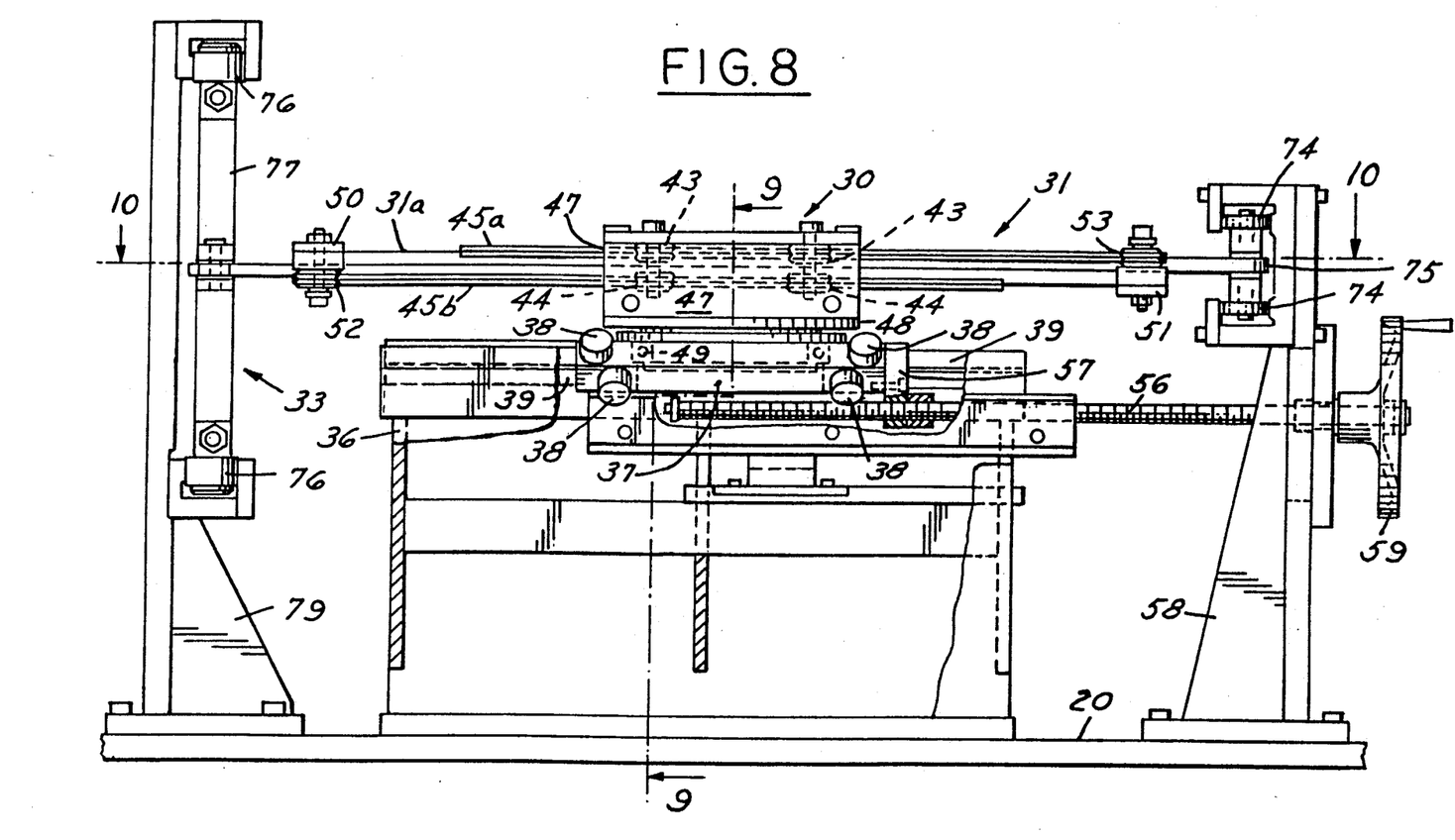
FIG. 8 is a view similar to FIG. 2 showing a manually adjustable mechanism.

A bracket 50, 51 on one end of each of the beam portions 31a, 31b supports a V-shaped guide roller 52, 53 engaging the the V-shaped guides 45b, 45a to assist in guiding the slide portions 31a, 31b. (FIGS. 7 and 8).

The differential beam 31 is thus mounted to the carriage 48 which is pivoted to slide 37. The position of pivot carriage 48 and, in turn, the position of the pivot point of the beam 31 can be adjusted relative to the slide 37 by means comprising a screw 56 threaded at one end to a bracket 57 on the slide 37 and at the other end on an upright 58 so that it can be rotated by a hand wheel 59 (FIG. 8). Alternatively, a servo driven linear actuator 60 has its actuating rod connected to a bracket 61 and its stationary end connected to the base 36 (FIG. 7).

Figure 12:
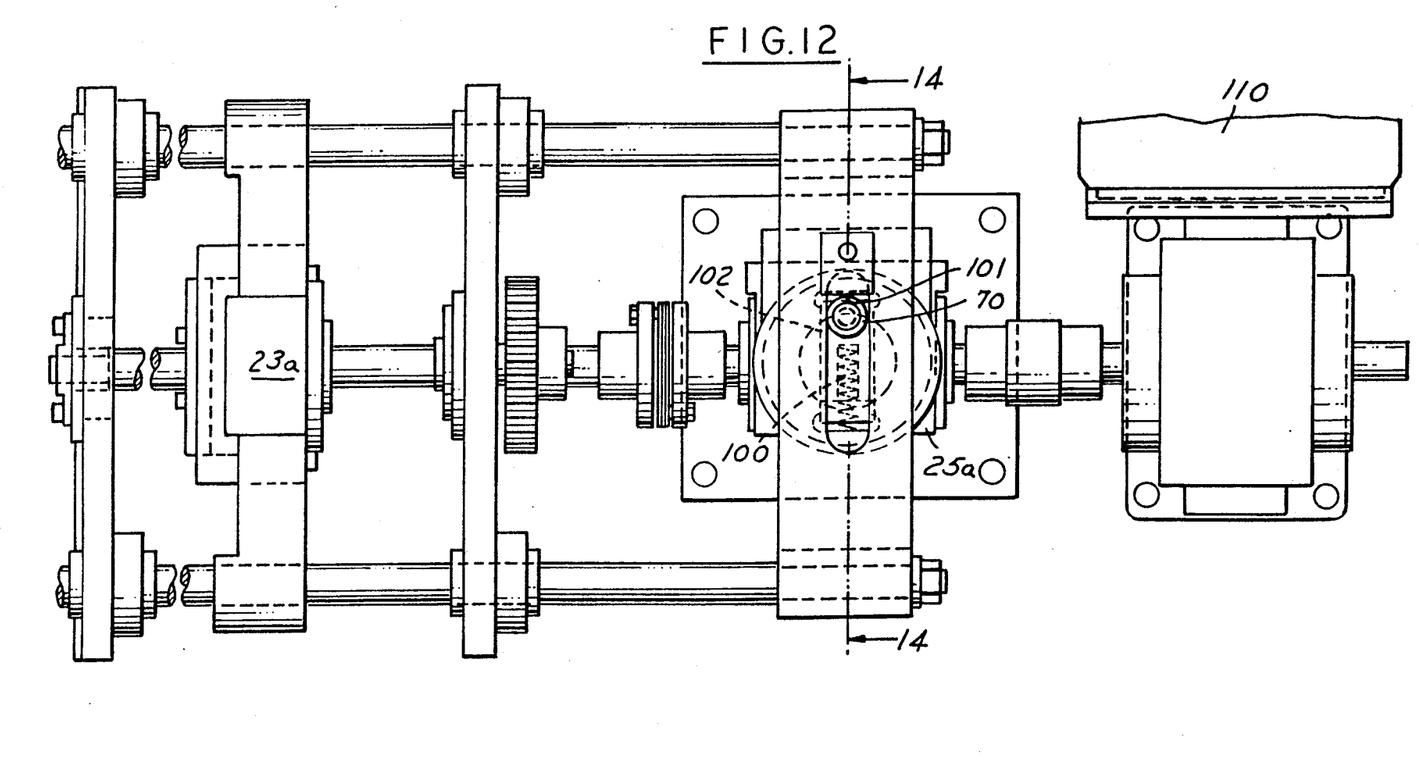
FIG. 12 is a fragmentary elevational view of a modified form of tube cut-off machine.
Figure 13:
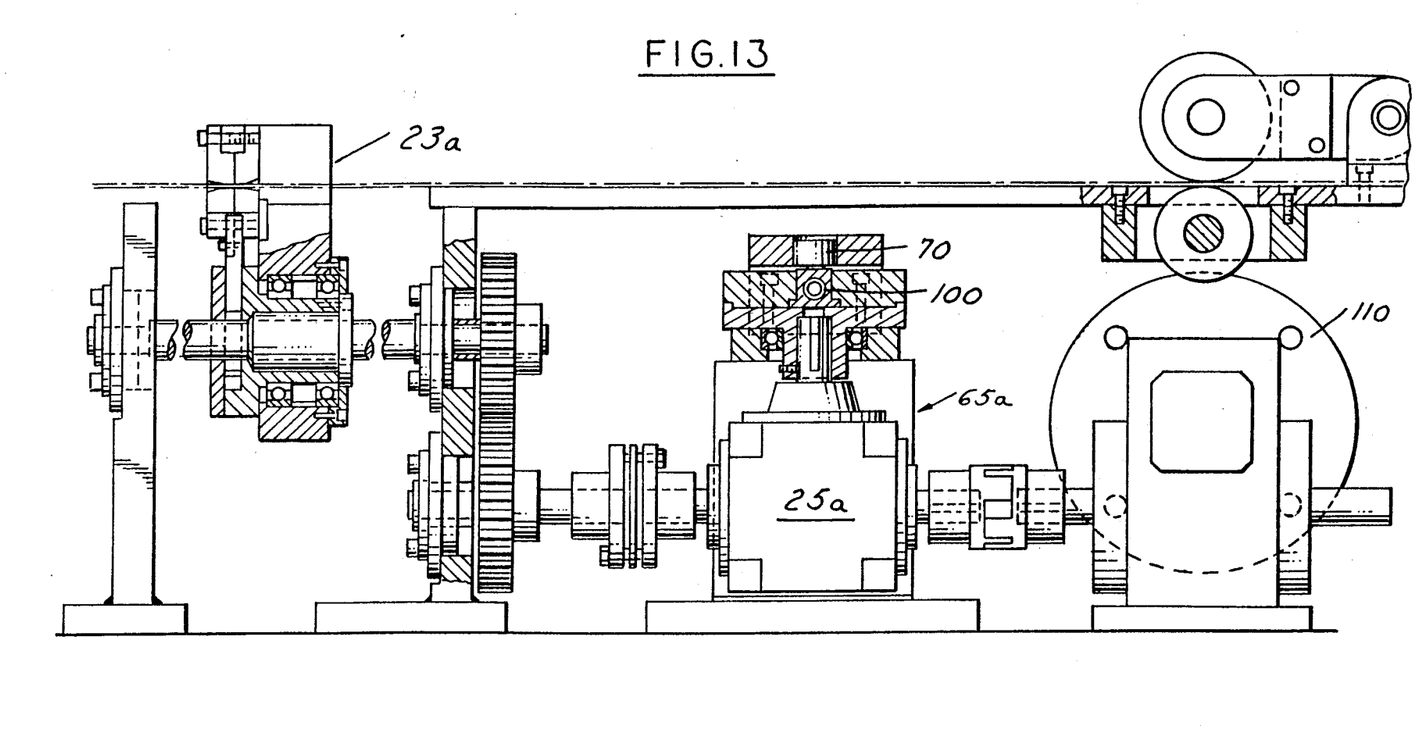
FIG. 13 is a part sectional elevational view of the machine shown in FIG. 12.
Figure 14:
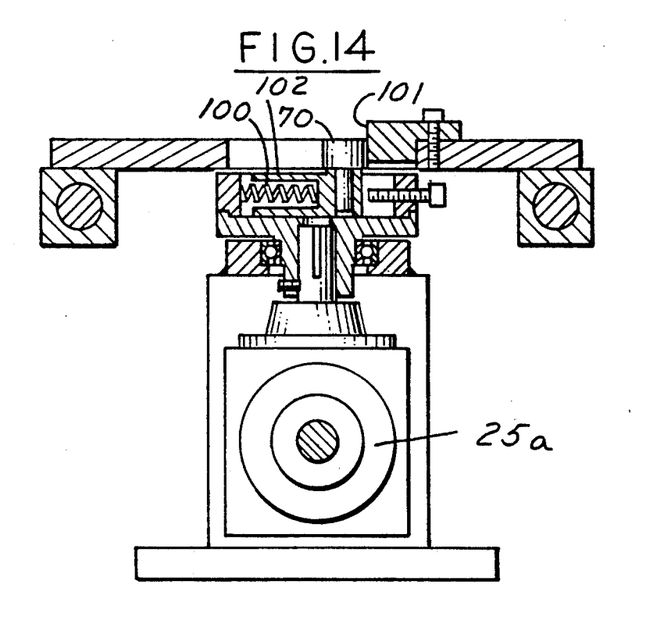
FIG. 14 is a sectional view taken along the line 14—14 in FIG. 12.
Figures 15, 16, 17:
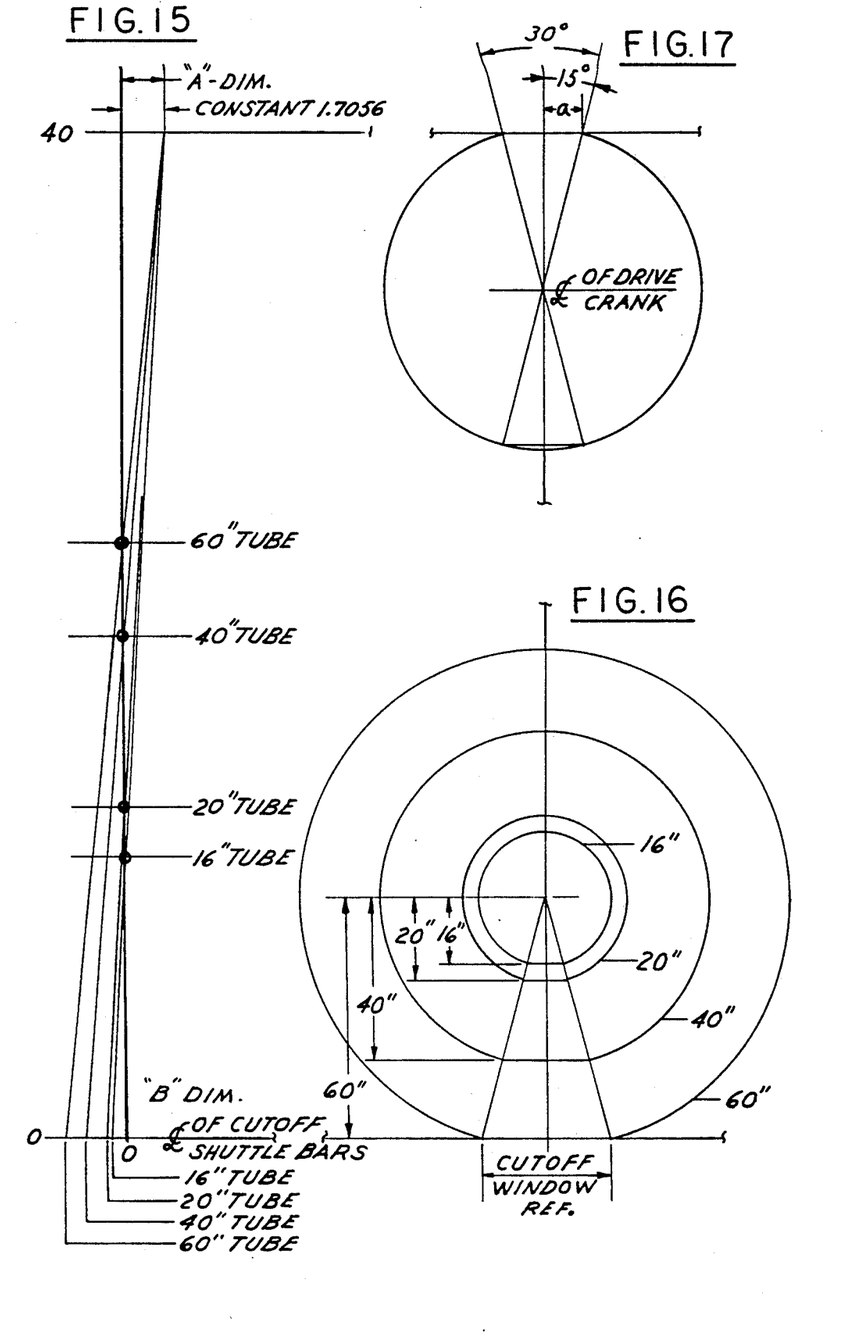
FIG. 15 is a diagrammatic view showing the manner in which the pivot point of the differential beam can be changed to provide for cutting tubes of different lengths.
FIGS. 16 and 17 show the relationship between the movement of the cutting apparatus relative to the movement of the crank during cut-off.

The form of the invention shown in FIGS. 12–14 is intended for use in as a cutting machine wherein the lengths of the tube to be cut is not to be exchanged frequently. In this form, a single cut off assembly 23a is rotated by a servo motor 110 through a servo motor drive 65a that incorporates a gear and crank assembly 25a. Gearing is provided from the crank assembly 25a to the cut off assembly 23a.

The gear and crank assembly 25a is substantially the same as that described above and includes a flat portion 101 of cam track engaged by a roller 70.

It can thus be seen that there has been provided a tube cut-off machine wherein the cut-off assemblies are being reciprocated at a speed corresponding with the speed of movement of the tube during the time that the lengths of tubing are being cut-off; wherein the machine achieves such results mechanically; and wherein the machine functions reliably and efficiently.

I claim:

1. An apparatus for cutting predetermined lengths from a moving length of roll form material such as tubing adapted to be positioned downstream from a source comprising
   at least one cut-off assembly including a knife blade that is moved in an endless path to cut a length of tubing which is being moved such that the knife blade is moved in a straight line tangential to its axis and transverse to the path of the tubing when the knife blade intersects the path of the tubing to cut the tubing,
   a servo motor drive for moving said knife blade in said endless path,
   said servo motor driving comprising
   a servo motor,
   a crank driven by said servo motor,
   a slot track,
   a cam follower on said crank engaging said slot track such that as the crank is rotated the cam follower is moved in a generally circular path,
   means yieldingly mounting said cam follower such that it is urged radially outwardly,
   said cam track having a flat portion on at least one end of said slot track, such that the cam follower traverses a straight line and the cam follower is yieldingly urged radially inwardly by said flat portion during contact of the cam follower with the flat portion of the slot track,
   said servo motor drive being connected to said cut-off assembly and said cam follower for moving said knife blade in said straight line of said endless path and during this movement the cam follower is in contact with said flat portion of said cam track such that the knife blade cuts tubing when the cam follower is in engagement with said flat portion.

2. An apparatus for cutting off predetermined lengths from a moving length of roll form material such as tubing adapted to be positioned downstream from a source comprising
   at least one cut-off assembly which is reciprocated longitudinally of the moving length of material and operated during the movement to sever a predetermined length,
   said cut-off assembly including a knife blade that is moved in an endless path to cut a length of tubing which is being moved,
   means for reciprocating said cut-off assembly such that the cutting occurs when the cut-off assembly is moving at a speed corresponding to the speed of movement of the tubing
   said means for reciprocating said cut-off assembly comprising a servo motor drive,
   means interconnecting said servo motor drive and said cut-off assembly including a servo motor crank drive assembly, including
   a servo motor
   a crank driven by said servo motor,
   a slot track,
   a cam follower on said crank engaging said slot track such that as the crank is rotated the cam follower is moved in a generally circular path,
   means yieldingly mounting said cam follower such that it is urged radially outwardly,
   said slot track having a flat tangential portion on at least one end of said slot track, such that the cam follower traverses a straight line and the cam follower is yieldingly urged radially inwardly by said flat portion during contact of the cam follower with the flat portion of the slot track,
   said servo motor crank drive assembly being connected to said cut-off assembly for moving said knife blade in said endless path such that during this movement the cam follower is in contact with the flat portion, the cut-off assembly moves at a uniform speed corresponding to the speed of movement of the tube at the time the length of tubing is being cut off,
   means for adjusting the machine to cut tubes of different lengths,
   said adjusting means comprising a differential beam pivot assembly wherein one end of the beam is driven in a linear reciprocating path by said crank and the other end of the beam is connected to reciprocate the cut-off assembly such that it is driven at a speed corresponding to the speed of the tube at the time the length of tubing is cut off.

3. An apparatus for cutting off predetermined lengths from a moving length of roll form material such as tubing adapted to be positioned downstream from a source comprising
   at least one cut-off assembly which is reciprocated longitudinally of the moving length of material and operated during the movement to sever a predetermined length,
   said cut-off assembly including a knife blade that is moved in an endless path to cut a length of tubing which is being moved such that the knife blade is moved in a straight line tangential to its axis and transverse to the path of the tubing when the knife blade intersects the path of the tubing to cut the tubing, means for reciprocating said cut-off assembly such that the cutting occurs when the cut-off assembly is moving at a speed corresponding to the speed of movement of the tubing, said means for reciprocating said cut-off assembly comprising a servo motor drive, means interconnecting said servo motor drive and said cut-off assembly including a servo motor crank drive assembly, including a servo motor, a crank driven by said servo motor, a slot track, a cam follower on said crank engaging said slot track such that as the crank is rotated the cam follower is moved in a generally circular path, means yieldingly mounting said cam follower such that it is urged radially outwardly, said slot track having a flat tangential portion on at least one end of said slot track, such that the cam follower traverses a straight line and the cam follower is yieldingly urged radially inwardly by said flat portion, during contact with the flat portion of the slot track, said servo motor crank drive assembly being connected to said cut-off assembly for moving said knife blade in said straight line of said endless path and during this movement the cam follower is in contact with the flat portion such that the cut-off assembly moves at a uniform speed corresponding to the speed of movement of the tube at the time the length of tubing is being cut off.

4. The cut-off machine set forth in claim 3 including means for adjusting the machine to cut tubes of different lengths, said adjusting means comprising a differential beam pivot assembly wherein one end of the beam is driven in a linear reciprocating path by said crank and the other end of the beam is connected to reciprocate the cut-off assembly such that it is driven at a speed corresponding to the speed of the tube at the time the length of tubing is cut off.

5. The apparatus set forth in claim 3 including means for adjusting the apparatus to cut tubes of different lengths.

* * * * *